(12) United States Patent
Nomamoto et al.

(10) Patent No.: US 10,388,043 B2
(45) Date of Patent: Aug. 20, 2019

(54) DISPLAY OF MANUFACTURING PROCESS AND FACILITY USED THEREFORE

(71) Applicant: FUJITSU LIMITED, Kawasaki-shi, Kanagawa (JP)

(72) Inventors: Satoshi Nomamoto, Yokohama (JP); Takehiko Nishimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/974,263

(22) Filed: May 8, 2018

(65) Prior Publication Data

US 2018/0253874 A1 Sep. 6, 2018

Related U.S. Application Data

(63) Continuation of application No. PCT/JP2015/084582, filed on Dec. 9, 2015.

(51) Int. Cl.
*G06T 11/20* (2006.01)
*G06Q 50/04* (2012.01)
(Continued)

(52) U.S. Cl.
CPC ........ *G06T 11/206* (2013.01); *G05B 23/0216* (2013.01); *G06Q 10/06* (2013.01);
(Continued)

(58) Field of Classification Search
None
See application file for complete search history.

(56) References Cited

U.S. PATENT DOCUMENTS 5,479,343 A * 12/1995 Matoba ............ G05B 19/41865
700/106
5,793,638 A * 8/1998 Yao ....................... B23P 21/004
700/226

(Continued)

FOREIGN PATENT DOCUMENTS

JP 2006-40039 2/2006
JP 2006-48350 2/2006

(Continued)

OTHER PUBLICATIONS

International Search Report dated Mar. 1, 2016 in corresponding International Patent Application No. PCT/JP2015/084582.

(Continued)

*Primary Examiner* — Jason A Pringle-Parker
(74) *Attorney, Agent, or Firm* — Staas & Halsey LLP

(57) ABSTRACT

A display method includes: displaying a line segment indicating a passage of time from start to end of a manufacturing process, with time axes aligned in a same direction, based on information of a start time and an end time of a manufacturing process of a product in each process of a manufacturing system that manufactures a product through a plurality of processes sequentially, in a state being segmented for each process in order of execution of the process, for each of one or more products manufactured by the manufacturing system, by a processor; and displaying a symbol representing a manufacturing facility belonging to a corresponding process in a segment matched with a separating position of the segment, by the processor.

6 Claims, 8 Drawing Sheets

(51) Int. Cl.
*G06Q 10/06* (2012.01)
*G05B 23/02* (2006.01)

(52) U.S. Cl.
CPC ... *G06Q 50/04* (2013.01); *G05B 2219/31472* (2013.01); *Y02P 90/02* (2015.11); *Y02P 90/18* (2015.11); *Y02P 90/30* (2015.11)

(56) References Cited

U.S. PATENT DOCUMENTS

| | | | | |
|---|---|---|---|---|
| 7,016,764 | B2* | 3/2006 | Penkar | G06Q 10/08 700/214 |
| 7,764,191 | B2* | 7/2010 | Hall | G05B 19/042 340/12.51 |
| 2005/0216111 | A1* | 9/2005 | Ooshima | G06Q 10/06 700/99 |
| 2006/0028672 | A1 | 2/2006 | Abiko | |
| 2007/0057789 | A1* | 3/2007 | Hamerly | G06Q 10/06 340/572.1 |
| 2009/0024239 | A1 | 1/2009 | Yoshioka et al. | |
| 2009/0048704 | A1* | 2/2009 | Redford | B07C 3/00 700/224 |
| 2013/0233922 | A1* | 9/2013 | Schoening | G06Q 10/087 235/385 |
| 2013/0346138 | A1* | 12/2013 | Rai | G06Q 10/06 705/7.24 |
| 2015/0097840 | A1 | 4/2015 | Nishimura et al. | |
| 2015/0277405 | A1 | 10/2015 | Ito et al. | |
| 2016/0085734 | A1* | 3/2016 | Piccazzo | G06F 17/2247 715/234 |

FOREIGN PATENT DOCUMENTS

| | | |
|---|---|---|
| JP | 2006039712 | 2/2006 |
| JP | 2006-302096 | 11/2006 |
| JP | 2009-87027 | 4/2009 |
| JP | 2009-87029 | 4/2009 |
| JP | 2009-93486 | 4/2009 |
| JP | 2009-187266 | 8/2009 |
| JP | 2010-3228 | 1/2010 |
| JP | 2010-40007 | 2/2010 |
| JP | 2012-185779 | 9/2012 |
| JP | 2015-75795 | 4/2015 |
| JP | 2015-191296 | 11/2015 |

OTHER PUBLICATIONS

Written Opinion of the International Searching Authority dated Mar. 1, 2016 in corresponding International Patent Application No. PCT/JP2015/084582.
Extended European Search Report, dated Nov. 29, 2018, in European Application No. 15910234.2 (8 pp.).
Office Action, dated Mar. 26, 2019, in Canadian Application No. 3007074 (6 pp.).

* cited by examiner

| | | | |
|---|---|---|---|
| 401 — ☐ | ID | 2118 | |
| 402 — ☐ | LOT NUMBER | 53590106+0 | |
| 403 — ☐ | TEMPORARY DRAWING NUMBER | CA933 | |

DISPLAY OF MANUFACTURING PROCESS AND FACILITY USED THEREFORE

CROSS-REFERENCE TO RELATED APPLICATION

This application is a continuation application of International Application PCT/JP2015/084582, filed on Dec. 9, 2015, and designating the U.S., the entire contents of which are incorporated herein by reference.

FIELD

The present invention relates to a display method, a display program, and a display control device.

BACKGROUND

Along with the popularization of IoT (Internet of Things), a large amount of data is generated on a daily basis by various types of devices in the manufacturing field, and a next-generation approach to manufacturing using such a large amount of data is under way.

For example, there has been proposed a technique of using log data collected from respective processes of a manufacturing line for visualization of production performance. Such visualization of production performance can be realized, as an example, by a display of a timeline obtained by making a line graph as a chart in which a start time or an end time of a manufacturing process corresponding to each process is plotted for individual bodies being transferred in a manufacturing line, where a time is indicated by a vertical axis and a process is indicated by a horizontal axis.

Patent Document 1: Japanese Patent Application Laid-open No. 2009-87027
Patent Document 2: Japanese Patent Application Laid-open No. 2009-93486
Patent Document 3: Japanese Patent Application Laid-open No. 2006-40039

However, according to the technique described above, as explained below, there is a case where it is difficult to visualize influences of a manufacturing route on productivity.

That is, the manufacturing facility arranged in each of the respective processes is not always one facility in one process, and a plurality of manufacturing facilities may be included in one process. In this manner, when a plurality of manufacturing facilities are included in one process, a display is provided in the timeline as if all the individual bodies are manufactured in the same manufacturing route, although there is a case where the corresponding manufacturing route may be different for some individual bodies. Therefore, it is difficult to visualize influences of the manufacturing route on productivity from the timeline described above.

SUMMARY

According to an aspect of the embodiments, a display method includes: displaying a line segment indicating a passage of time from start to end of a manufacturing process, with time axes aligned in a same direction, based on information of a start time and an end time of a manufacturing process of a product in each process of a manufacturing system that manufactures a product through a plurality of processes sequentially, in a state being segmented for each process in order of execution of the process, for each of one or more products manufactured by the manufacturing system, by a processor; and displaying a symbol representing a manufacturing facility belonging to a corresponding process in a segment matched with a separating position of the segment, by the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

A display method, a display program, and a display control device according to the present application will be described below in detail with reference to the accompanying drawings. The disclosed technique is not limited to these embodiments. The respective embodiments can be combined with each other within a scope where no contradictions occur in the processing contents.

First Embodiment

Figure 1:
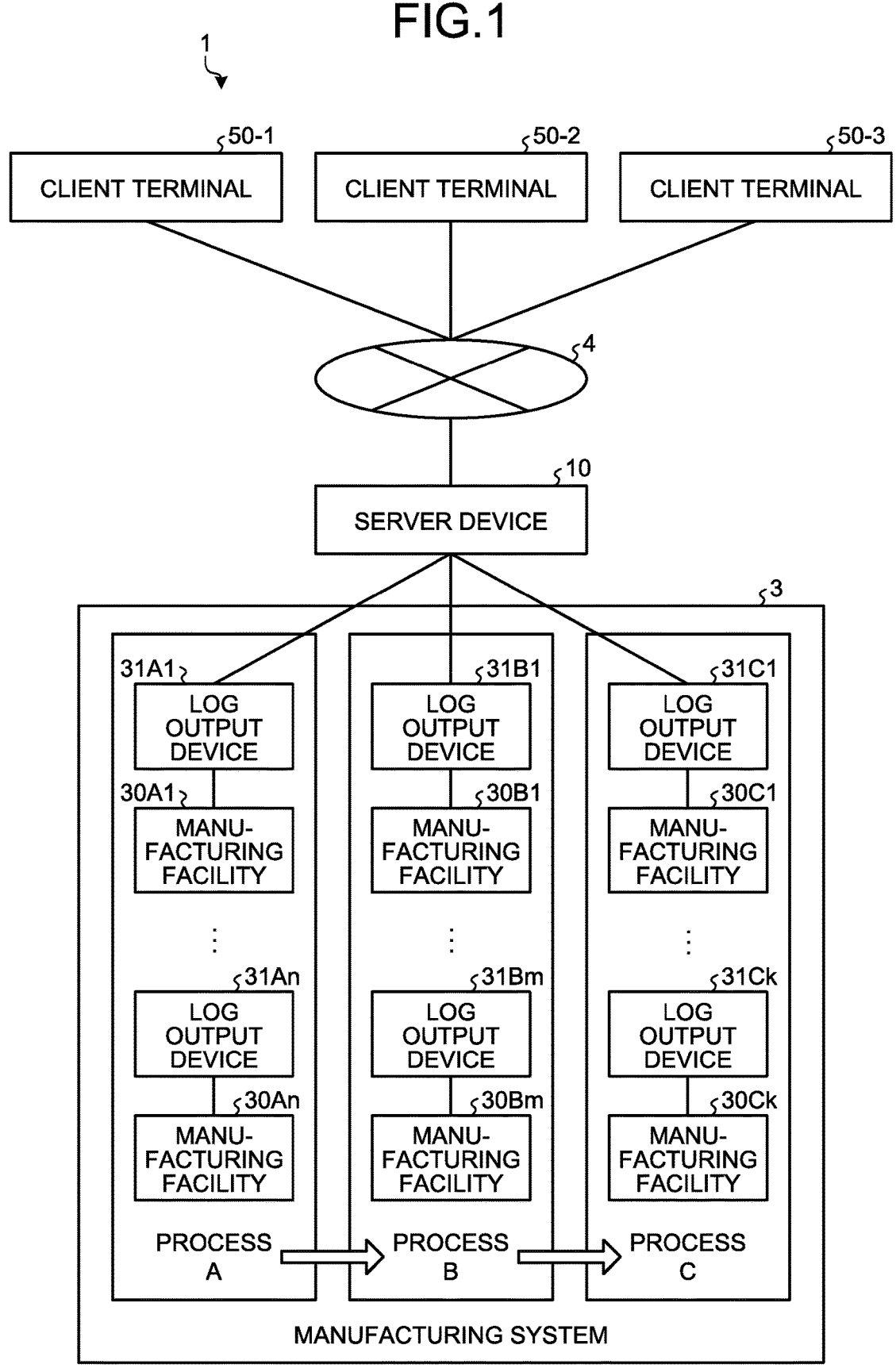
FIG. 1 is a diagram illustrating a configuration of a log-data analysis system according to a first embodiment.

[Log-Data Analysis System]
FIG. 1 is a diagram illustrating a configuration of a log-data analysis system according to a first embodiment. A log-data analysis system 1 illustrated in FIG. 1 provides a log-data analysis service that analyzes log data collected from respective processes A to C of a manufacturing system 3. As a function of the log-data analysis system 1, the log-data analysis system 1 realizes visualization of production performance in the manufacturing system 3.

As illustrated in FIG. 1, the log-data analysis system 1 includes a server device 10 and client terminals 50-1 to 50-3. In the following descriptions, when the respective client terminals 50-1 to 50-3 are collectively referred to, these elements may be described as "client terminal 50". In FIG. 1, a case where three client terminals 50 are accommodated in the server device 10 is exemplified. However, the server device 10 is not limited to the illustrated example, and an arbitrary number of client terminals 50 can be accommodated in the server device 10.

The server device 10 is a computer that provides the log-data analysis service described above to the client terminal 50.

As one embodiment, the server device 10 can be implemented by installing a monitoring program that realizes the log-data analysis service described above as package software or online software into a desired computer. For example, the server device 10 can be implemented as a Web server that provides the log-data analysis service described above or can be implemented as a cloud that provides the log-data analysis service described above by outsourcing.

The client terminal 50 is a computer that receives the log-data analysis service described above from the server device 10. The client terminal 50 can be used, as an example, by the relevant persons involved in the manufacturing system 3 including field workers and administrators of the manufacturing system 3.

As one embodiment, a personal computer can be employed as the client terminal 50. The client terminal 50 is not limited to a stationary information processing device such as the personal computer, and various types of mobile terminal devices can be employed as the client terminal 50. The "mobile terminal devices" referred to herein include mobile communication terminals such as a smartphone, a mobile phone, and a PHS (Personal Handyphone System), and a slate terminal and a tablet terminal in its category.

The server device 10 and the client terminal 50 are connected to each other via a network 4. As the network 4, as an example, an arbitrary type of communication network including the Internet, a LAN, and a VPN (Virtual Private Network) can be employed regardless of being wired or wireless.

Meanwhile, in the manufacturing system 3, as illustrated in FIG. 1, a manufacturing line including three processes of a process A, a process B, and a process C is established. In such a manufacturing line, at least one manufacturing facility that performs a manufacturing process corresponding to each process is provided, and the number of manufacturing facilities provided in one process is not always limited to one, and a plurality of manufacturing facilities may be provided in one process according to the design of the manufacturing line. FIG. 1 illustrates a case where the processes included in the manufacturing line are three, which are the processes A to C. However, this is only an example, and an arbitrary number of processes can be provided.

For example, the manufacturing process corresponding to the process A is performed by n manufacturing facilities 30A1 to 30An. It is assumed here that "n" included in the reference sign indicates an arbitrary natural number equal to or larger than 1. These manufacturing facilities 30A1 to 30An are connected to log output devices 31A1 to 31An that output log data of the manufacturing process. Further, the log output devices 31A1 to 31An are connected to the server device 10. In the following descriptions, when the manufacturing facilities 30A1 to 30An are collectively referred to, they may be described as "manufacturing facility 30A", and when the log output devices 31A1 to 31An are collectively referred to, they may be described as "log output device 31A".

Similarly, the manufacturing process corresponding to the process B is performed by m manufacturing facilities 30B1 to 30Bm, and the manufacturing process corresponding to the process C is performed by k manufacturing facilities 30C1 to 30Ck. All the "n", "m", and "k" can be the same natural number, a part of them can be the same natural number, or all of them can be different natural numbers. While the manufacturing facilities 30B1 to 30Bm are connected to the log output devices 31B1 to 31Bm, the manufacturing facilities 30C1 to 30Ck are connected to the log output devices 31C1 to 31Ck. Further, the log output devices 31B1 to 31Bm and 31C1 to 31Ck are connected to the server device 10.

In the following descriptions, when the manufacturing facilities 30B1 to 30Bm are collectively referred to, they may be described as "manufacturing facility 30B", and when the log output devices 31B1 to 31Bm are collectively referred to, they may be described as "log output device 31B". Further, when the manufacturing facilities 30C1 to 30Ck are collectively referred to, they may be described as "manufacturing facility 30C", and when the log output devices 31C1 to 31Ck are collectively referred to, they may be described as "log output device 31C". Furthermore, when all the log output devices 31A, 31B, and 31C included in the manufacturing system 3 are collectively referred to, they may be described as "log output device 31".

The log output device 31 transmits log data to the server device 10. For example, the log output device 31 uploads the following log data to the server device 10, every time there is a start event in which a manufacturing process is started in the manufacturing facility 30 connected to the log output device 31 or an end event in which a manufacturing process is ended in the manufacturing facility 30. As an example, data in which items such as identification information of an individual body to which the manufacturing process is performed, event identification information identifying the start event or the end event, an event occurrence time, and identification information of the manufacturing facility 30 connected with the log output device 31 are associated with each other can be employed as the log data. The "individual body" referred to herein indicates a raw material or the like before being processed to be a product by the manufacturing process corresponding to each process.

In this manner, log data collected from the log output device 31 by the server device 10, which is so-called big data, is used for visualization of the production performance by the server device 10. A functional configuration of the server device 10 is specifically explained below.

[Server Device 10]

Figure 2:
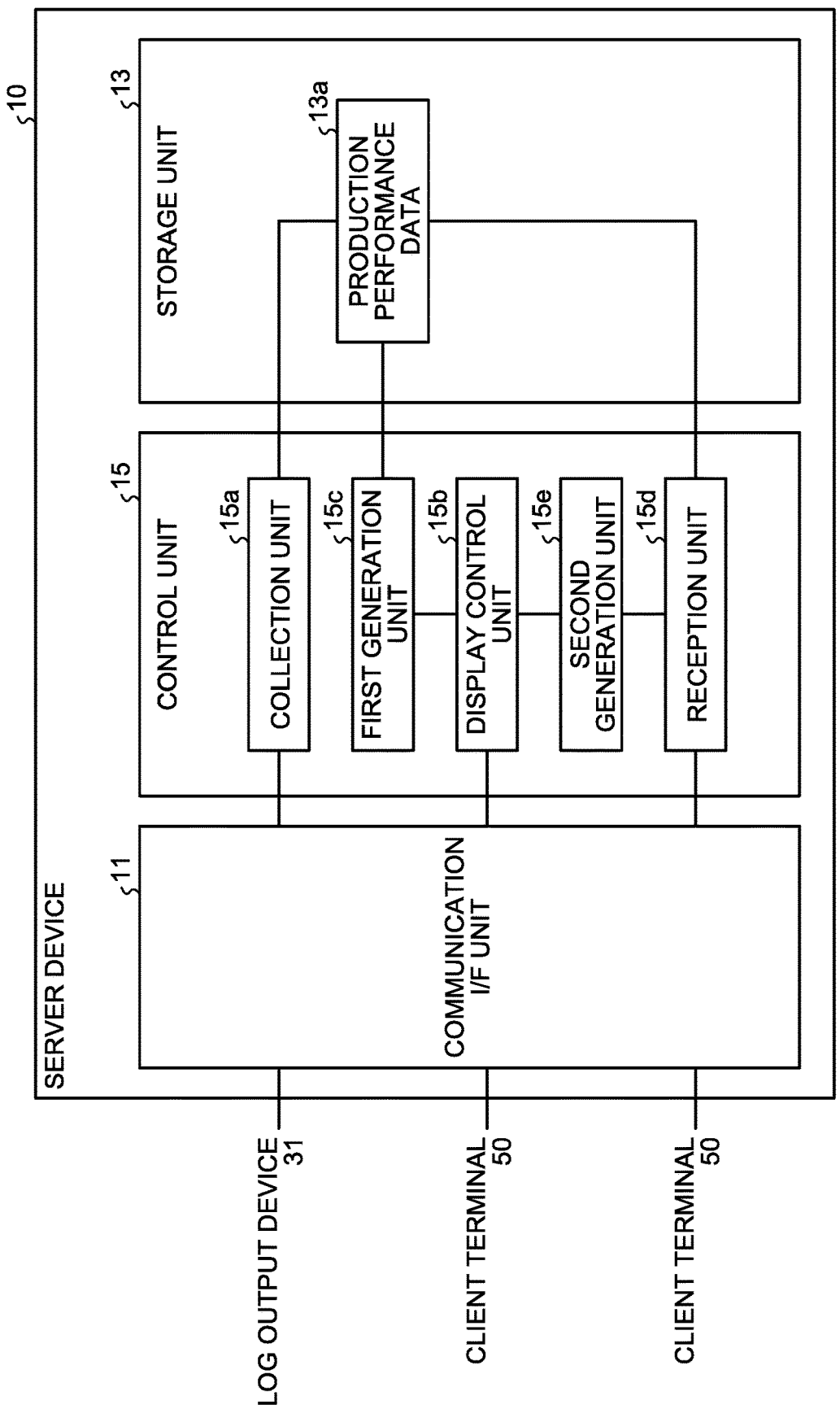
FIG. 2 is a block diagram illustrating a functional configuration of a server device according to the first embodiment.

FIG. 2 is a block diagram illustrating a functional configuration of the server device 10 according to the first embodiment. As illustrated in FIG. 2, the server device 10 includes a communication I/F unit 11, a storage unit 13, and a control unit 15. In FIG. 2, a solid line indicating an input/output relation of data is illustrated. However, this is illustrated only for a minimum portion for convenience sake of explanation. That is, input and output of data related to respective processing units are not limited to the illustrated example, and input and output of data other than the illustrated example, for example, between processing units, between a processing unit and data, and between a processing unit and an external device can be performed.

The communication I/F unit 11 is an interface that performs communication control between the server device 10 and other devices, such as between the server device 10 and the log output device 31, and between the server device 10 and the client terminal 50.

As one embodiment, a network interface card such as a LAN card can be employed as a mode of the communication I/F unit 11. For example, the communication I/F unit 11 can receive log data from the log output device 31. Further, the communication I/F unit 11 performs reception of a browsing request of a manufacturing report in which the production performance of the manufacturing system 3 is visualized and transmission of display data of the manufacturing report to the client terminal 50.

The storage unit 13 is a storage device that stores therein data used for various types of programs such as an application program that realizes the log-data analysis service described above, including an OS (Operating System) performed by the control unit 15.

As one embodiment, the storage unit 13 can be implemented as an auxiliary storage device in the server device 10. For example, an HDD (Hard Disk Drive), an optical disk, or an SSD (Solid State Drive) can be employed as the storage unit 13. The storage unit 13 does not always need to be implemented as the auxiliary storage device, and can be implemented as a main storage device in the server device 10. In this case, various semiconductor memory elements, for example, a RAM (Random Access Memory) and a flash memory can be employed as the storage unit 13.

The storage unit 13 stores therein production performance data 13a as an example of data to be used for a program executed by the control unit 15. Other than the production performance data 13a, other pieces of electronic data, for example, display setting data of a graph or a chart generated by the server device 10, drawing data of a product manufactured by the manufacturing system 3, and correspondence relation data of a product, LOT, and a temporary drawing number can be stored at the same time. The production performance data 13a is not static data stored beforehand, and thus the production performance data 13a is explained along with explanations of a processing unit that performs registration or referencing of respective data.

The control unit 15 includes an internal memory that stores therein various types of programs and control data and performs various types of processing by using these programs and control data.

As one embodiment, the control unit 15 is implemented as a central processing device, which is a so-called CPU (Central Processing Unit). The control unit 15 does not always need to be implemented as a central processing device and can be implemented as an MPU (Micro Processing Unit). The control unit 15 can be also realized by a hard-wired logic such as an ASIC (Application Specific Integrated Circuit) or an FPGA (Field Programmable Gate Array).

The control unit 15 virtually realizes the processing units described below by developing a display program stored in the storage unit 13 as an application program that realizes the log-data analysis service described above as a process on a work area of a RAM such as a DRAM (Dynamic Random Access Memory) or an SRAM (Static Random Access Memory) implemented as a main storage device (not illustrated).

For example, as illustrated in FIG. 2, the control unit 15 includes a collection unit 15a, a display control unit 15b, a first generation unit 15c, a reception unit 15d, and a second generation unit 15e.

The collection unit 15a is a processing unit that collects log data.

As one embodiment, the collection unit 15a performs processes described below, every time log data is uploaded from the log output device 31. That is, the collection unit 15a performs update of a record corresponding to the identification information of an individual body included in the log data, in the production performance data 13a in which items such as identification information of the manufacturing facility 30 that performs a manufacturing process corresponding to each process, the start time of the manufacturing process and the end time of the manufacturing process are associated with each other for each identification information of an individual body. For example, the collection unit 15a identifies a record having the identification information of the individual body included in the log data, in the records included in the production performance data 13a. Further, the collection unit 15a identifies a field of a process corresponding to the identification information of the manufacturing facility 30 included in the log data, among the fields of the process held by the record identified previously. Further, the collection unit 15a registers the time of event occurrence included in the log data in a field corresponding to the identification information of the event included in the log data, among the fields of the start time and the end time of the manufacturing process included in the fields of the process held by the record identified previously. For example, while in a case of the start event, a time is stored in a field of the start time, in a case of the end event, a time is stored in a field of the end time. In this manner, the collection unit 15a registers the start time or the end time of the manufacturing process and registers the identification information of the manufacturing facility 30 included in the log data in a field for storing the information of the manufacturing facility 30, included in the fields of the process identified previously. Due to this configuration, even when a plurality of manufacturing facilities 30 are included in one process, a computer can be caused to perform visualization of production performance in a state where the manufacturing facility 30 having performed the manufacturing process can be identified.

The display control unit 15b is a processing unit that executes display control with respect to the client terminal 50.

As one embodiment, upon reception of a browsing request of a manufacturing report from the client terminal 50, the display control unit 15b causes the client terminal 50 to display a manufacturing report screen including a timeline screen generated by the first generation unit 15c and a manufacturing route screen generated by the second generation unit 15e. The "timeline" referred to herein indicates a line graph, such as a sequential line graph charted by plotting a start time and an end time of a manufacturing process corresponding to each process on time axes arranged in parallel for respective segments of the start and end of the manufacturing process, according to a performing order of processes included in the manufacturing line, for each product being transferred on the manufacturing line. The "manufacturing route" indicates a route formed by connecting symbols on the manufacturing line on which symbols representing the manufacturing facilities 30 are arranged while corresponding to the number of manufacturing facilities 30 belonging to the process for each process.

The time axes included in the "timeline" and the symbols included in the "manufacturing route" are displayed in a state of being associated with each other. That is, the symbol of the manufacturing facility 30 belonging to each process is displayed in a section defined by, as a boundary, two time axes corresponding to the respective segments of the start and end of the manufacturing process. Therefore, when the respective time axes of the "timeline" are displayed in parallel in a vertical direction, a manufacturing route screen is displayed on the upper side or the lower side of the timeline screen. When the respective time axes of the "timeline" are displayed in parallel in a horizontal direction, the manufacturing route screen is displayed on the left side or the right side of the timeline screen. In the following descriptions, an area in which a timeline screen is displayed on a manufacturing report screen may be described as "first screen area", and an area in which a manufacturing route screen is displayed thereon may be described as "second screen area".

The first generation unit 15c is a processing unit that generates display data on a timeline screen.

As one embodiment, upon reception of a browsing request of a manufacturing report from the client terminal 50, the first generation unit 15c generates display data of the timeline screen described above. When the timeline screen is to be displayed, it is difficult to display timelines regarding all the products, because there is a limitation on the screen size that can be displayed by the display device of the client terminal 50. Therefore, there is described a case where products whose timelines are displayed are narrowed down by limiting a time length of the time axis displayed on the timeline screen to a certain period. As an example of the display range of a timeline, a case where a period of roughly an integral multiple of a lead time of a product is set is assumed here and explained below.

More specifically, the first generation unit 15c sets the display range of a timeline based on date and time when the browsing request of the manufacturing report is received, or date and time specified by a browsing request. Subsequently, the first generation unit 15c selects one record among the records of the production performance data 13a stored in the storage unit 13. One record of the production performance data 13a corresponds to one product, and thus selection of a record means selection of one individual body being transferred in a manufacturing line. Subsequently, the first generation unit 15c determines whether any of the oldest start time of the start times of the manufacturing process or the latest end time of the end times of the manufacturing process included in the record selected previously is included in the display range of the timeline. When the oldest start time or the latest end time is included in the display range of the timeline, the first generation unit 15c saves the record in a work area of an internal memory (not illustrated), thereby extracting a product corresponding to the record. On the other hand, when any of the oldest start time and the latest end time is not included in the display range of the timeline, the record is not saved in the work area of the internal memory. The first generation unit 15c repeatedly performs extraction of the record until all the records in the production performance data 13a are selected.

Thereafter, when all the records in the production performance data 13a have been selected, the first generation unit 15c performs the following processing. That is, the first generation unit 15c plots the start time and the end time of the manufacturing process for each process included in the record on the respective time axes of the timeline for each record saved in the internal memory, and makes a sequential line graph by connecting the plotted points. Due to this operation, the display data on the timeline screen is generated.

The reception unit 15d is a processing unit that receives designation of a manufacturing route to be displayed.

As one embodiment, the reception unit 15d can receive designation of a line segment included in the sequential line graph on the timeline screen displayed on the client terminal 50. For example, when a mouse is used as an example of a pointing device, the reception unit 15d receives designation of a line segment by a mouseover operation or receives designation of a line segment by an operation of left click or right click of the line segment. The reception unit 15d can receive a display range of the timeline as a manufacturing route to be displayed. Designation of the display range of the timeline can be received under any conditions. For example, designation of the display range can be received under a condition that a specific operation by an input device such as a mouse or a keyboard is detected, or under a condition that a non-operation state is detected over a predetermined period, or the display range of a timeline can be set as a manufacturing route to be displayed in a default state.

The second generation unit 15e is a processing unit that generates display data on a manufacturing route screen.

As an aspect, when designation of a line segment is received by the reception unit 15d, the second generation unit 15e performs the following processing. That is, the second generation unit 15e refers to a record of a product corresponding to the line segment to which designation has been received by the reception unit 15d, among the records saved in a work area of an internal memory, so as to search for identification information of a manufacturing facility 30 in which the manufacturing process of the product has been performed for each process. Subsequently, the second generation unit 15e makes a chart of the manufacturing route regarding the product by connecting symbols corresponding to the manufacturing facilities 30 in each process hit in the previous search, among the symbols of the manufacturing facilities 30 arranged while corresponding to the number of manufacturing facilities 30 belonging to the corresponding process, for each process. Due to this configuration, display data on the manufacturing route screen is generated. While a case where a manufacturing route is visualized by connecting symbols has been exemplified, visualization of the manufacturing route can be performed by distinguishing a display mode of a symbol corresponding to the manufacturing facility 30 that has hit in the previous search from a display mode of a symbol corresponding to the manufacturing facility 30 that has not hit in the previous search.

As another aspect, the second generation unit 15e performs the following processing, when designation of the display range of a timeline has been received by the reception unit 15d. That is, the second generation unit 15e refers to a record of each product saved in a work area of an internal memory, so as to perform processing for searching for identification information of the manufacturing facility 30 in which the manufacturing process of the product has been performed for each process repeatedly over all the records. The second generation unit 15e then repeatedly performs drawing processing that connects symbols corresponding to the manufacturing facilities 30 in each process that has hit in the previous search, among the symbols of the manufacturing facilities 30 arranged while corresponding to the number of manufacturing facilities 30 belonging to the corresponding process, for each process over all the records saved in the work area of the internal memory. In this manner, by making a chart of a manufacturing route regarding the respective products included in the display range of a timeline, display data on a manufacturing route screen is generated.

[First Specific Example of Manufacturing Report]

Figure 3:
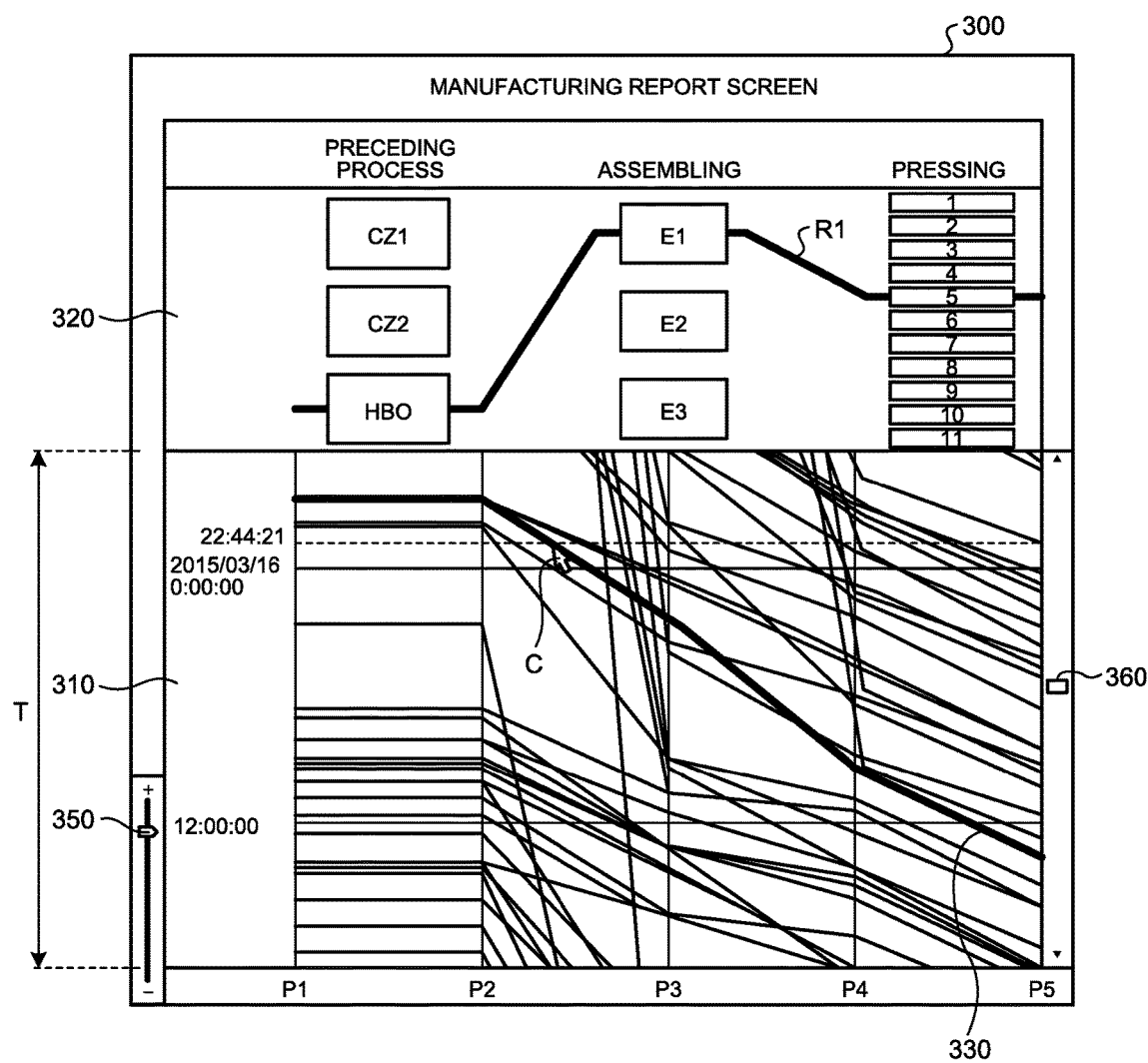
FIG. 3 is a diagram illustrating an example of a manufacturing report screen.

A display method of a manufacturing report according to the present embodiment is described next. FIG. 3 is a diagram illustrating an example of the manufacturing report screen. In FIG. 3, as an example of the manufacturing line, three processes "preceding process", "assembling", and "pressing" related to manufacturing of a printed circuit board are extracted and illustrated. The three processes illustrated in FIG. 3 are performed in order of the "preceding process" for performing surface treatment in which plating such as copper is applied to a plastic board, "assembling" for overlapping surface-treated plastic boards on each other between layers, and "pressing" for applying pressure and heat to the overlapped plastic boards, that is, in order from the left direction to the right direction. Among the three processes illustrated in FIG. 3, in the two processes of "preceding process" and "assembling", there is illustrated a case where logs of the start time, of the start time and the end time of the manufacturing process, are recorded, whereas in the "pressing", there is illustrated a case where both logs of the start time and the end time of the manufacturing process are recorded.

As illustrated in FIG. 3, a manufacturing report screen 300 includes a timeline screen 310 and a manufacturing route screen 320. For example, on the timeline screen 310, time axes P1 to P5 are arranged in parallel for respective segments of the start and end of the manufacturing process. Among these time axes, the time axis P1 indicates a timing when a manufacturing process corresponding to the "preceding process" starts, and the time axis P2 indicates a timing when a manufacturing process corresponding to the "preceding process" ends. The time axis P3 indicates a timing when a manufacturing process corresponding to the "assembling" starts. The time axis 4 indicates a timing when a manufacturing process corresponding to the "pressing" starts, and the time axis P5 indicates a timing when a manufacturing process corresponding to the "pressing" ends. Further, a timeline regarding a record of a product in which one of the oldest start time or the latest end time of the records included in the production performance data 13a is included in a display range T of the timeline is displayed on the timeline screen 310.

Meanwhile, on the manufacturing route screen 320, symbols representing the manufacturing facilities 30 are displayed while corresponding to the number of manufacturing facilities 30 included in the respective processes, for each of the three processes "preceding process", "assembling", and "pressing". For example, in an example of the process "preceding process", symbols representing three manufacturing facilities of "CZ1", "CZ2", and "HBO" are displayed. In an example of the process "assembling", symbols representing three manufacturing facilities of "E1", "E2", and "E3" are displayed. In an example of the process "pressing", symbols representing eleven manufacturing facilities of "1" to "11" are displayed.

On the display of the manufacturing report screen 300, when a mouse cursor C is hovered over a line segment included in a sequential line graph 330 on the timeline screen 310, the sequential line graph 330 to which mouseover is performed, among the sequential line graphs displayed on the timeline screen 310, is highlighted and a manufacturing route R1 regarding a product to which mouseover is performed is displayed on the manufacturing route screen 320. By the display of the manufacturing route R1, the relevant persons involved in the manufacturing system 3 can ascertain that the product is manufactured in order of the manufacturing facility "HBO" in the process "preceding process", the manufacturing facility "E1" in the process "assembling", and the manufacturing facility "5" in the process "pressing" at a glance. For example, the product corresponding to the sequential line graph 330 is a product that is determined as defective in the pressing by the process "pressing", it can be tracked that a trouble has occurred in the manufacturing facility "5" among the eleven manufacturing facilities "1" to "11" with a simple operation of designating a line segment included in the sequential line graph 330. Therefore, according to the display of the manufacturing route R1 described above, influences of the manufacturing route on productivity can be visualized.

[Second Specific Example of Manufacturing Report]

In a manufacturing line, it is not always the case that only products of the same type are manufactured, and products of a different type may be present together and manufactured. In this case, there may be a case where it is desired to collectively confirm the manufacturing routes for the products of the same type. Therefore, as an example, a case where a manufacturing route of products grouped in a unit of LOT or a unit of temporary drawing number is displayed is explained.

Figures 4A, 4B:
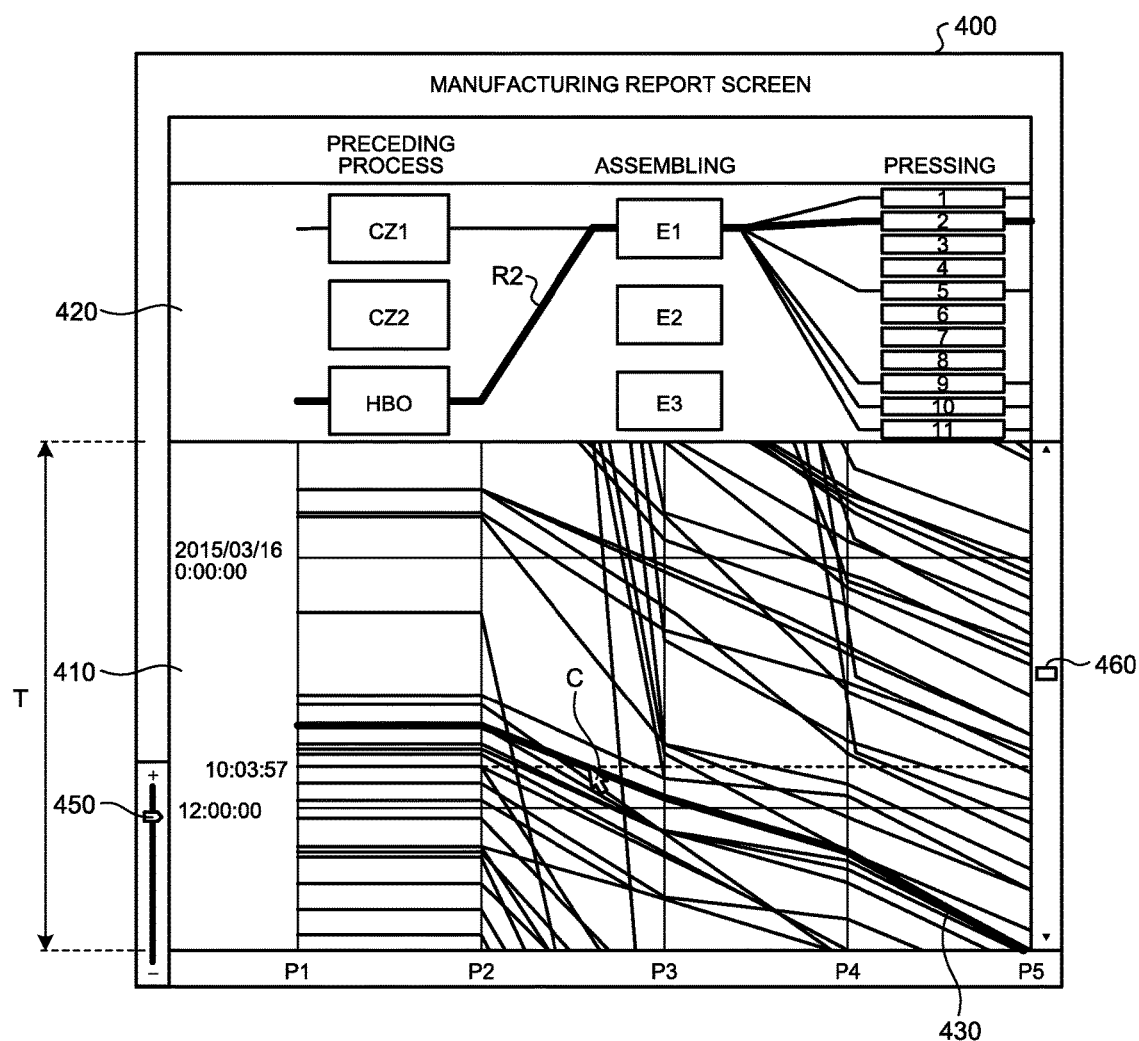
FIG. 4A is a diagram illustrating an example of grouping of products.
FIG. 4B is a diagram illustrating an example of the manufacturing report screen.

FIG. 4A is a diagram illustrating an example of grouping of products. FIG. 4B is a diagram illustrating an example of the manufacturing report screen. In FIG. 4B, as in the manufacturing report screen 300 illustrated in FIG. 3, as an example of the manufacturing line, three processes "preceding process", "assembling", and "pressing" related to manufacturing of a printed circuit board are extracted and illustrated. The time axes P1 to P5 included in a timeline screen 410 and the symbols included in a manufacturing route screen 420 in FIG. 4B are the same as those on the manufacturing report screen 300 illustrated in FIG. 3.

In FIG. 4A, as an example of a GUI (Graphical User Interface) component that designates granularity to display a manufacturing route, check boxes 401 to 403 are illustrated. For example, when the check box 401 for an ID is checked, as illustrated in FIG. 3, a manufacturing route of a product to which mouseover is performed is displayed on the manufacturing route screen 320. When the check box 402 for a LOT number is checked, products having the same LOT number as the product to which mouseover is performed are grouped. Further, when the check box 403 for a temporary drawing number is checked, all the products manufactured according to the same design specification as that of the product to which mouseover is performed are grouped.

For example, when the mouse cursor C is hovered over a line segment included in a sequential line graph 430 on the timeline screen 410 illustrated in FIG. 4B, in a state where the check box 402 for a LOT number illustrated in FIG. 4A is checked, the sequential line graph 430 to which mouseover is performed, among the sequential line graphs displayed on the timeline screen 410, is highlighted. Further, products having the same LOT number as the product to which mouseover is performed are grouped in the same group and a plurality of manufacturing routes regarding the group of the products having a relevant LOT number are displayed on the manufacturing route screen 420. Due to the display of the manufacturing route, for example, a manufacturing facility having been used and a manufacturing facility not used for manufacturing of the product having a relevant LOT number can be distinguished from each other and ascertained. Further, when the manufacturing routes are displayed, the manufacturing route R2 for the product corresponding to the line segment to which mouseover is performed can be distinguished from a display mode of other products having the same LOT number by highlighting.

[Third Specific Example of Manufacturing Report]

In the first specific example and the second specific example described above, there has been exemplified a case of displaying a manufacturing route of a product corresponding to a line segment included in a sequential line graph to which mouseover is performed. However, manufacturing routes regarding respective products included in the display range T of a timeline can be displayed.

Figure 5:
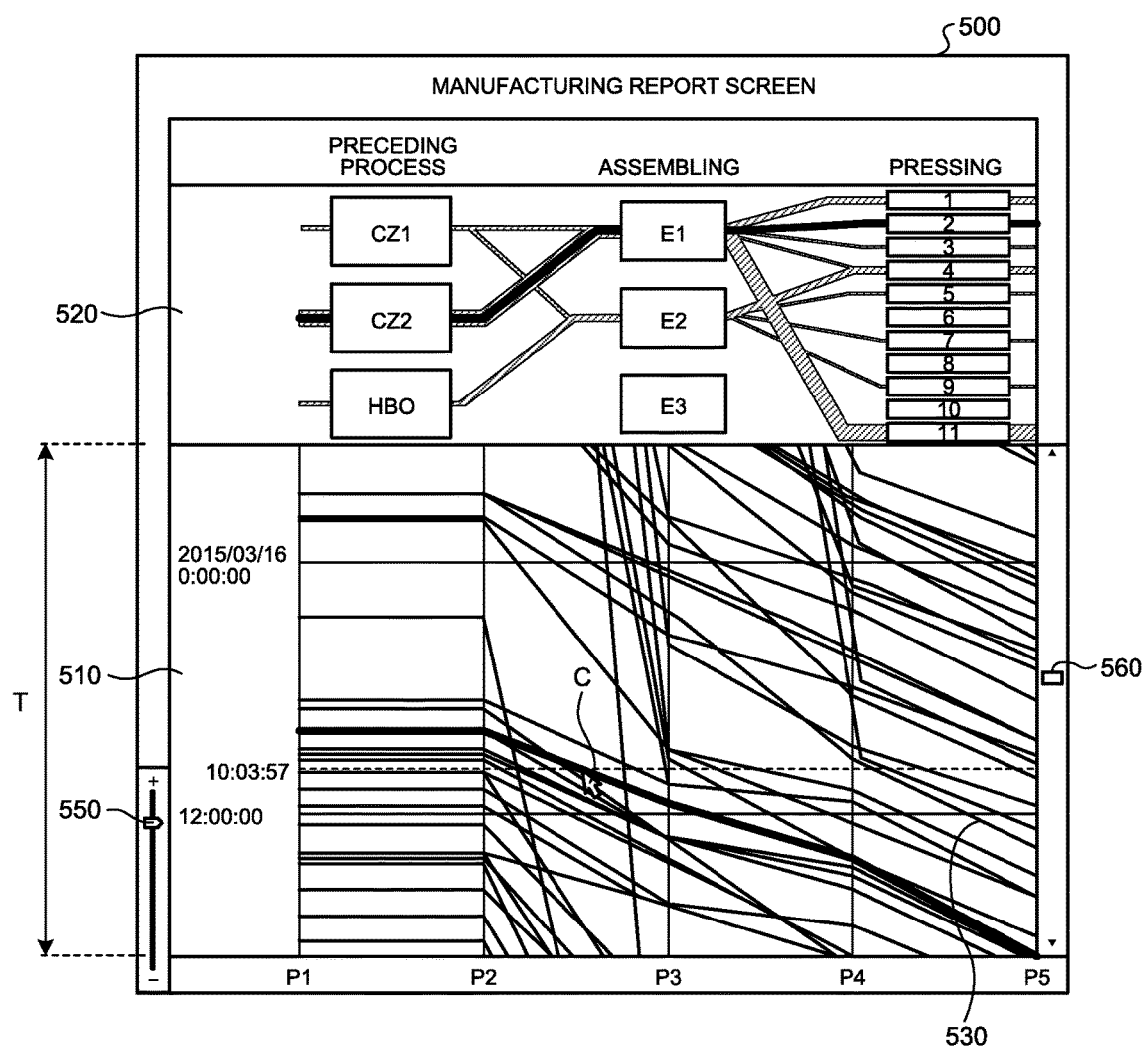
FIG. 5 is a diagram illustrating an example of the manufacturing report screen.

FIG. 5 is a diagram illustrating an example of the manufacturing report screen. In FIG. 5, as in the manufacturing report screen 300 illustrated in FIG. 3, as an example of the manufacturing line, three processes "preceding process", "assembling", and "pressing" related to manufacturing of a printed circuit board are extracted and illustrated. The time axes P1 to P5 included in a timeline screen 510 and the symbols included in a manufacturing route screen 520 in FIG. 5 are the same as those on the manufacturing report screen 300 illustrated in FIG. 3.

On the display of a manufacturing report screen 500 illustrated in FIG. 5, when designation of the display range T of a timeline is received by the reception unit 15d as a manufacturing route to be displayed, manufacturing routes related to the respective products included in the display range T of the timeline are displayed. When the display of the timeline and the display of the manufacturing routes are linked with each other, the display of the manufacturing routes related to a plurality of products can be realized while omitting complicated operations such as designation of a period by using a pull-down menu or a text box.

In this case, for each line segment connecting the symbols of manufacturing facilities, the number of products manufactured in a combination of manufacturing facilities corresponding to the line segment can be aggregated between two processes adjacent to each other, and as a result of aggregate calculation, as the number of products increases, display of the line segment can be displayed thicker. Due to this configuration, the display of the manufacturing route screen 520 illustrated in FIG. 5 can be realized. According to the display of the manufacturing route screen 520, biased manufacturing routes of the products can be ascertained by the relevant persons or the like involved in the manufacturing system 3. For example, if a line segment thicker than other line segments is displayed, it can be ascertained that the manufacturing process has been performed only by the route of the thick line segment, and thus the relevant persons involved can pay attention to exhaustion of the manufacturing facility. Further, the relevant persons involved can ascertain that the manufacturing process has not been performed in the corresponding route between symbols not connected by a line segment, and that there is room for operations.

[Change of Display Range]

The length of time of the display range T of a timeline can be changed by moving a slider 350, 450, or 550 illustrated in FIG. 3, FIG. 4B, and FIG. 5 on a slider bar. For example, when the slider 350, 450, or 550 is moved in a direction of "+", the length of time of the display range T of the timeline can be increased. When the slider 350, 450, or 550 is moved in a direction of "−", the length of time of the display range T of the timeline can be decreased.

[Process Flow]

A process flow of the server device 10 according to the present embodiment is explained next. (1) a first display process of displaying a timeline screen is explained first, and (2) a second display process of displaying a manufacturing route screen is explained next.

(1) First Display Process

Figure 6:
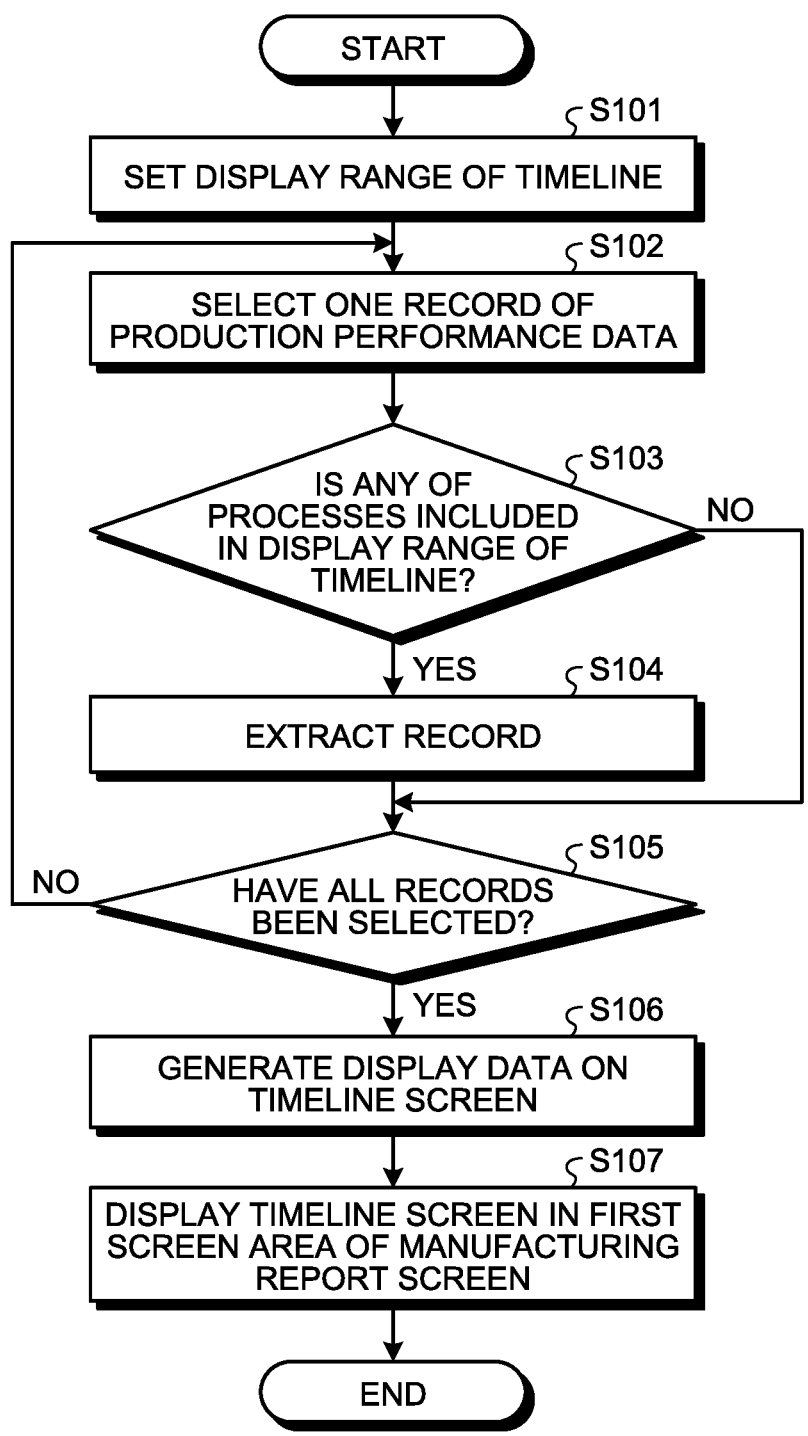
FIG. 6 is a flowchart illustrating a procedure of a first display process according to the first embodiment.

FIG. 6 is a flowchart illustrating a procedure of the first display process according to the first embodiment. As an example, the process is started when a browsing request of a manufacturing report is received from the client terminal 50.

As illustrated in FIG. 6, the first generation unit 15c sets the display range of a timeline based on the date and time when a browsing request of a manufacturing report has been received or the date and time specified by the browsing request (Step S101). Subsequently, the first generation unit 15c selects one record among the records in the production performance data 13a stored in the storage unit 13 (Step S102).

Subsequently, the first generation unit 15c determines whether any of the oldest start time among the start times of the manufacturing process or the latest end time among the end times of the manufacturing process included in the record selected at Step S102 is included in the display range of the timeline (Step S103).

When the oldest start time or the latest end time is included in the display range of the timeline (YES at Step S103), the first generation unit 15c saves the record in a work area of an internal memory (not illustrated), thereby extracting a product corresponding to the record (Step S104). Meanwhile, when the oldest start time or the latest end time is not included in the display range of the timeline (NO at Step S103), the record is not saved in the work area of the internal memory, and the processing proceeds to the process at Step S105.

The first generation unit 15c repeatedly performs the process at Step S102 to Step S104 described above until all the records in the production performance data 13a are selected (NO at Step S105). Thereafter, when all the records in the production performance data 13a have been selected (YES at Step S105), the following processing is performed.

That is, the first generation unit 15c plots the start time and the end time of the manufacturing process per process included in the record on the respective time axes of the timeline, for each record saved in the internal memory, and makes a sequential line graph by connecting the plotted points, thereby generating display data on a timeline screen (Step S106).

Subsequently, the display control unit 15b causes the display data on the timeline screen generated at Step S106 to be displayed in the first screen area (Step S107), and the processing is ended. On the stage at Step S107, the state can be made such that a manufacturing route screen is not displayed, or only the symbols of the manufacturing facilities included in the respective processes are displayed on a manufacturing route screen and a line segment connecting the symbols is not displayed.

(2) Second Display Process

Figure 7:
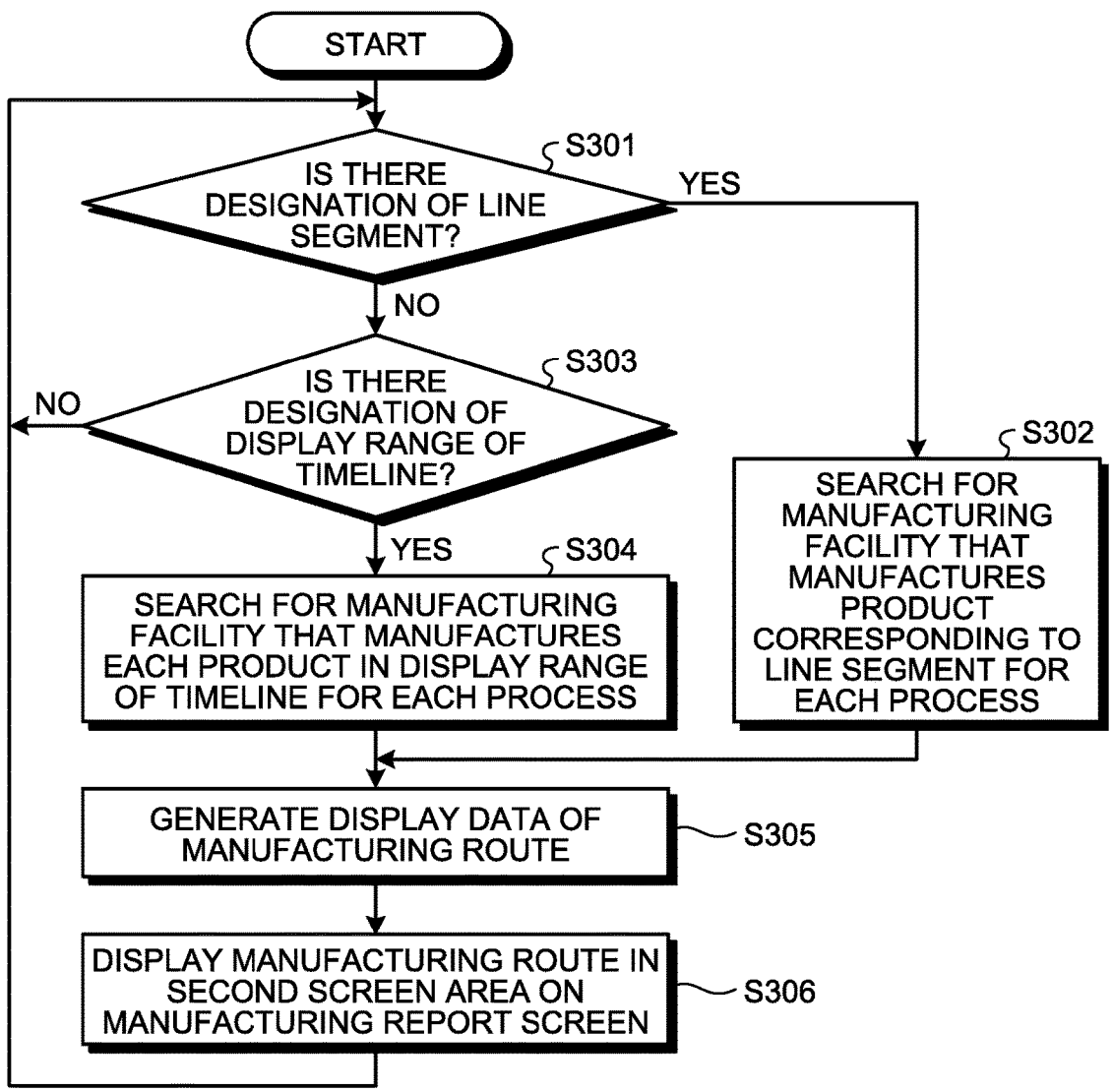
FIG. 7 is a flowchart illustrating a procedure of a second display process according to the first embodiment.

FIG. 7 is a flowchart illustrating a procedure of the second display process according to the first embodiment. As an example, the second display process is performed after the first display process illustrated in FIG. 6 is ended. As illustrated in FIG. 7, upon reception of designation of a line segment included in a sequential line graph on a timeline screen (YES at Step S301), the second generation unit 15e searches for identification information of a manufacturing facility 30 in which the manufacturing process of the product has been performed for each process, by referring to the record of the product corresponding to the line segment, to which designation has been received at Step S301, among the records saved in a work area of the internal memory at Step S104 illustrated in FIG. 6 (Step S302).

When the display range of a timeline has been received as a manufacturing route to be displayed (YES at Step S303), the second generation unit 15e performs the processing of searching for the identification information of a manufacturing facility 30 in which the manufacturing process of the product has been performed for each process repeatedly for all the records, by referring to the records of the respective products saved in the work area of the internal memory at Step S104 illustrated in FIG. 6 (Step S304).

Subsequently, the second generation unit 15e makes a chart of a manufacturing route related to the product, by connecting symbols corresponding to the manufacturing facilities 30 in the respective processes hit in the search at Step S302 or at Step S304, among the symbols of the manufacturing facilities 30 arranged while corresponding to the number of manufacturing facilities 30 belonging to the corresponding process, for each process. Accordingly, the display data on the manufacturing route screen is generated (Step S305).

Subsequently, the display control unit 15b causes the display data on the manufacturing route screen generated at Step S305 to be displayed in the second screen area (Step S306), and the processing returns to the process at Step S301.

[One Aspect of Effects]

As described above, the server device 10 according to the present embodiment displays in parallel a timeline of a product in which the passage of time from the start and end for each of processes included in a manufacturing line is arranged in order of execution of the processes and a manufacturing route connecting the symbols of facilities between adjacent processes. Therefore, according to the server device 10 of the present embodiment, influences of the manufacturing route on productivity can be visualized.

Second Embodiment

While an embodiment related to the disclosed device has been described above, other than the above embodiment, the present invention can be also carried out in variously different modes. Other embodiments included in the present invention are described below.

[Shift of Display Range]

For example, the server device 10 can shift the display range of a timeline manually or automatically. For example, by moving the scroll bar 360, 460, or 560 illustrated in FIG. 3, FIG. 4B, and FIG. 5, the display range of the timeline can be shifted in a chronological direction of time. For example, when the scroll bar 360, 460, or 560 is moved upward, the display range can be shifted in a direction moving back in time, while maintaining the length of time of the display range of the timeline. Further, when the scroll bar 360, 460, or 560 is moved downward, the display range can be shifted in a direction of passage of time, while maintaining the length of time of the display range of the timeline. The display range of the timeline can be automatically shifted through a GUI component that switches the mode to an animation mode or the like. Every time the display range of the timeline is shifted in this manner, the display is updated on a manufacturing route screen from a manufacturing route related to each product included in the display range T of the timeline before the shift to a manufacturing route related to each product included in the display range T+1 of the timeline after the shift.

[Separation and Integration]

The respective constituent elements of the respective devices illustrated in the drawings do not always need to be physically configured as illustrated. That is, the specific modes of separation and integration of the respective devices are not limited to those illustrated in the drawings, and a part or all of these devices can be configured in a functionally or physically separated or integrated manner in an arbitrary unit in accordance with various types of loads and the status of use. For example, the collection unit 15a, the display control unit 15b, the first generation unit 15c, the reception unit 15d, or the second generation unit 15e can be connected to the server device 10 as an external device thereof via a network. Further, the collection unit 15a, the display control unit 15b, the first generation unit 15c, the reception unit 15d, or the second generation unit 15e can be provided in other devices respectively and connected to each other via the network to cooperate with each other, thereby realizing the functions of the server device 10 described above.

[Display Program]

The various types of processes described in the above embodiment can be realized by executing a program prepared in advance by a computer such as a personal computer or a workstation. In the following descriptions, an example of a computer that executes a display program having the functions identical to those of the embodiment described above is explained with reference to FIG. 8.

Figure 8:
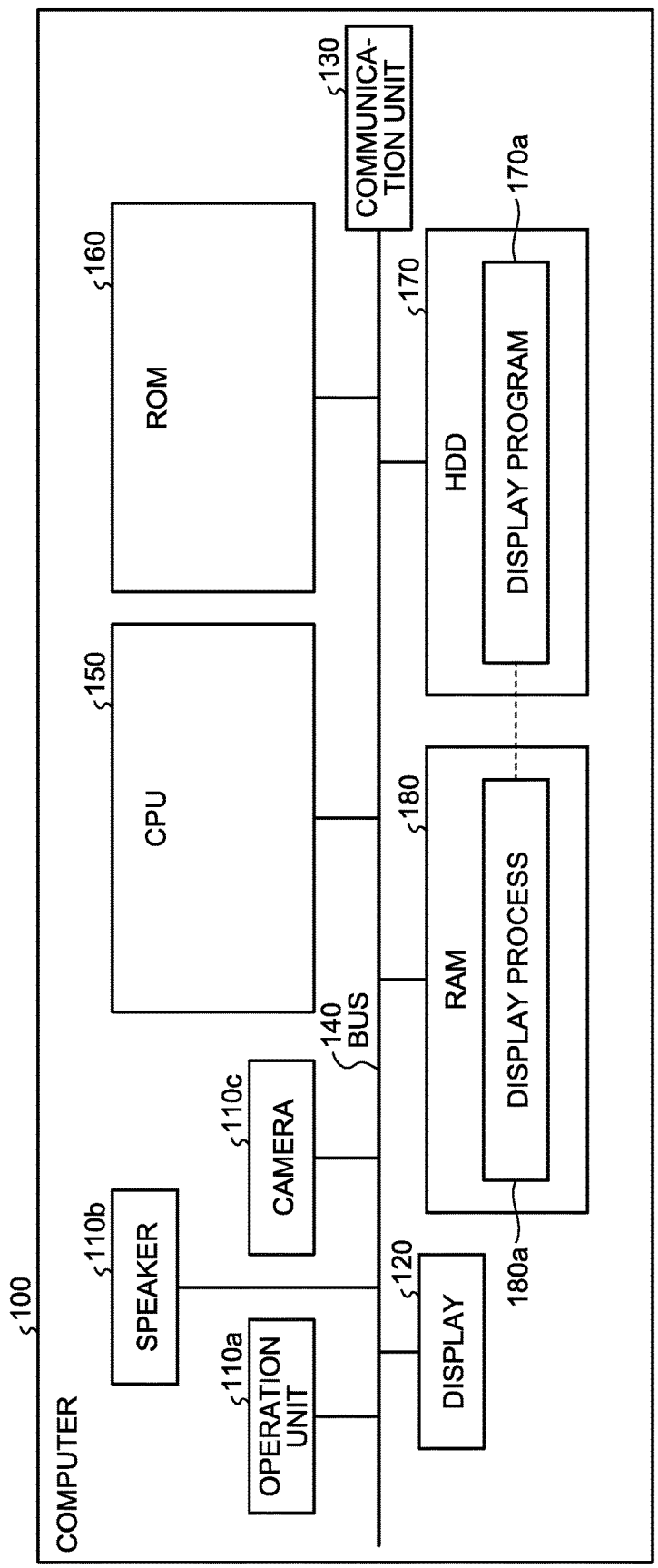
FIG. 8 is a diagram illustrating a hardware configuration example of a computer that executes a display program according to the first embodiment and a second embodiment.

FIG. 8 is a diagram illustrating a hardware configuration example of a computer that executes the display program according to the first embodiment and a second embodiment. As illustrated in FIG. 8, a computer 100 includes an operation unit 110a, a speaker 110b, a camera 110c, a display 120, and a communication unit 130. The computer 100 also includes a CPU 150, a ROM 160, an HDD 170, and a RAM 180. The respective units 110 to 180 are connected to each other via a bus 140.

As illustrated in FIG. 8, the HDD 170 stores therein a display program 170a that exerts functions identical to those of the collection unit 15a, the display control unit 15b, the first generation unit 15c, the reception unit 15d, and the second generation unit 15e explained in the first embodiment described above. The display program 170a can be integrated or separated as in the respective constituent elements of the collection unit 15a, the display control unit 15b, the first generation unit 15c, the reception unit 15d, and the second generation unit 15e illustrated in FIG. 2. That is, all the pieces of data explained in the first embodiment described above do not always need to be stored in the HDD 170, and it suffices that only the data to be used for the processing is stored in the HDD 170.

Under such an environment, the CPU 150 reads out the display program 170a from the HDD 170 and develops the program on the RAM 180. As a result, the display program 170a functions as a display process 180a as illustrated in FIG. 8. The display process 180a develops various pieces of data read out from the HDD 170 in an area allocated to the display process 180a, in a storage area of the RAM 180, so as to perform various types of processing by using the developed various pieces of data. For example, as an example of processing performed by the display process 180a, the processing illustrated in FIG. 6 and FIG. 7 is included. In the CPU 150, all the processing units explained in the first embodiment described above do not always need to be operated, and it suffices that only the processing unit corresponding to the processing to be performed is realized virtually.

The display program 170a described above do not always need to be stored in advance in the HDD 170 and the ROM 160. For example, respective programs are stored in "portable physical mediums" such as a flexible disk, a so-called FD, a CD-ROM, a DVD, a magneto-optical disk, and an IC card. It is possible to configure that the computer 100 then acquires respective programs from such portable physical mediums and executes these programs. It is also possible to configure that respective programs are stored in other computers or server devices that are connected to the computer 100 via a public communication line, the Internet, a LAN, a WAN, and the like, and the computer 100 acquires and executes these programs.

It is possible to visualize influences of a manufacturing route on productivity.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A display method comprising:
   displaying, by a processor, in a first screen area, line graphs respectively corresponding to products, wherein
     a product is manufactured in a manufacturing system by processing an individual body sequentially through a plurality of processes that use manufacturing facilities,
     in the first screen area, a plurality of time axes are arranged in a same direction, the time axes including a start time axis and an end time axis and corresponding to the plurality of processes,
     a first start point on a first start time axis indicates a start time of a first process performed on the individual body,
     when a first end time axis is provided a first end point thereon indicates an end time of the first process, start times and end times being acquired from log data collected from the manufacturing facilities,
     a second start point on a second start time axis indicates a start time of a second process performed on a processed individual body by the first process,
     a line segment connects the first start point or the first end point and the second start point,
     other line segments respectively connect a first start point or a first end point and a second start point for other processes performed on the processed individual body, and
     a line graph comprises line segments that include the line segment and the other line segments;
   displaying, by the processor, in a second screen area, symbols representing the manufacturing facilities including first manufacturing facilities any of which is used for the first process and second manufacturing facilities any of which is used for the second process, symbols for the first manufacturing facilities being indicated in a segment corresponding to a position indicated by the first start time axis and the first end time axis for the first process, symbols for the second manufacturing facilities being indicated in a segment corresponding to a position indicated by the second start time axis for the second process; and
   displaying in the second screen area, when a line segment included in a line graph is selected in the first screen area, a symbol for a manufacturing facility that is used for a process of an individual body for a product corresponding to the line graph in an identifiable manner, based on the log data.

2. A display method comprising:
   displaying, by a processor, in a first screen area, line graphs respectively corresponding to products, wherein
     a product is manufactured in a manufacturing system by processing an individual body sequentially through a plurality of processes that use manufacturing facilities,
     in the first screen area, a plurality of time axes are arranged in a same direction, the time axes including a start time axis and an end time axis and corresponding to the plurality of processes,
     a first start point on a first start time axis indicates a start time of a first process performed on the individual body,
     when a first end time axis is provided a first end point thereon indicates an end time of the first process, start times and end times being acquired from log data collected from the manufacturing facilities,
     a second start point on a second start time axis indicates a start time of a second process performed on a processed individual body by the first process,
     a line segment connects the first start point or the first end point and the second start point,
     other line segments respectively connect a first start point or a first end point and a second start point for other processes performed on the processed individual body, and
     a line graph comprises line segments that include the line segment and the other line segments;
   displaying, by the processor, in a second screen area, symbols representing the manufacturing facilities including first manufacturing facilities any of which is used for the first process and second manufacturing facilities any of which is used for the second process, symbols for the first manufacturing facilities being indicated in a segment corresponding to a position indicated by the first start time axis and the first end time axis for the first process, symbols for the second manufacturing facilities being indicated in a segment corresponding to a position indicated by the second start time axis for the second process; and
   displaying, by the processor, in the second screen area, when a line segment included in a line graph is selected in the first screen area, information indicating which manufacturing facility is used for processing an individual body for a product corresponding to the line graph, based on the log data.

3. The display method according to claim 2, wherein the information is displayed as a line graph that connects marks that each indicate manufacturing facilities that are used for the processing, by the processor.

4. A display method comprising:
   displaying, by a processor, in a first screen area, line graphs respectively corresponding to products, wherein
     a product is manufactured in a manufacturing system by processing an individual body sequentially through a plurality of processes that use manufacturing facilities,
     in the first screen area, a plurality of time axes are arranged in a same direction, the time axes including a start time axis and an end time axis and corresponding to the plurality of processes,
     a first start point on a first start time axis indicates a start time of a first process performed on the individual body,
     when a first end time axis is provided a first end point thereon indicates an end time of the first process, start times and end times being acquired from log data collected from the manufacturing facilities, a second start point on a second start time axis indicates a start time of a second process performed on a processed individual body by the first process, a line segment connects the first start point or the first end point and the second start point, other line segments respectively connect a first start point or a first end point and a second start point for other processes performed on the processed individual body, and a line graph comprises line segments that include the line segment and the other line segments;

displaying, by the processor, in a second screen area, symbols representing the manufacturing facilities including first manufacturing facilities any of which is used for the first process and second manufacturing facilities any of which is used for the second process, symbols for the first manufacturing facilities being indicated in a segment corresponding to a position indicated by the first start time axis and the first end time axis for the first process, symbols for the second manufacturing facilities being indicated in a segment corresponding to a position indicated by the second start time axis for the second process; and displaying, by the processor, in the second screen area, when a line segment included in a line graph is selected in the first screen area, information indicating which manufacturing facility is used for processing an individual body for a product corresponding to the line graph, based on the log data, wherein when selection of a time period having a certain length of time is received, the displaying in the first screen area includes displaying line graphs, time indicated by points on the line graphs being included in the time period, by the processor.

5. The display method according to claim 4, wherein the information is displayed as a line graph that connects marks that each indicate manufacturing facilities that are used for the processing, by the processor.

6. The display method according to claim 5, wherein the line graph connecting the marks is displayed thicker as a number of products corresponding to the line graph increases, by the processor.

\* \* \* \* \*